US 9,017,065 B2
(12) United States Patent
Rauch (10) Patent No.: US 9,017,065 B2
(45) Date of Patent: Apr. 28, 2015

(54) REVERSE FLOW REGENERATIVE APPARATUS AND METHOD (75) Inventor: Edwin L. Rauch, Fulton, NY (US)

(73) Assignee: Novelis Inc., Atlanta, GA (US)

( * ) Notice: Subject to any disclaimer, the term of this patent is extended or adjusted under 35 U.S.C. 154(b) by 636 days.

(21) Appl. No.: 13/335,090

(22) Filed: Dec. 22, 2011

(65) Prior Publication Data
US 2012/0164588 A1  Jun. 28, 2012

Related U.S. Application Data (60) Provisional application No. 61/460,049, filed on Dec. 23, 2010.

(51) Int. Cl.
F23L 15/00 (2006.01)
F27D 99/00 (2010.01)
F23L 15/02 (2006.01)

(52) U.S. Cl.
CPC .............. *F27D 99/0033* (2013.01); *F23L 15/02* (2013.01)

(58) Field of Classification Search
CPC ................... F23G 7/068; F23L 15/02; F23L 2900/15022; F27B 3/263; F27B 9/3044; F27D 17/00; F27D 17/004; F27D 2017/007
USPC ................. 431/11, 161, 170, 215; 126/152 R, 126/163 R; 165/4, 10, 909
See application file for complete search history.

(56) References Cited

U.S. PATENT DOCUMENTS

| 2,236,635 | A | * | 4/1941 | Young et al. ................ 165/5 |
| 3,870,474 | A |   | 3/1975 | Houston |
| 4,257,193 | A | * | 3/1981 | Williams ..................... 49/465 |
| 4,307,773 | A |   | 12/1981 | Smith |
| 4,378,045 | A |   | 3/1983 | Balke et al. |
| 4,558,731 | A | * | 12/1985 | Pentikainen et al. .......... 165/4 |
| 4,768,949 | A | * | 9/1988 | Goodfellow .................. 432/214 |
| 4,793,974 | A | * | 12/1988 | Hebrank ..................... 422/175 |

(Continued)

FOREIGN PATENT DOCUMENTS

| GB | 137 574 A | 1/1920 |
| GB | 2 192 264 A | 1/1988 |

(Continued)

OTHER PUBLICATIONS

Suzukawa, JP 10153307 A, English machine translation.*

(Continued)

*Primary Examiner* — Jorge Pereiro
(74) *Attorney, Agent, or Firm* — Kilpatrick Townsend & Stockton, LLP (57) ABSTRACT An exemplary embodiment provides a regenerative burner apparatus. The apparatus includes a burner housing having a gas channel and a single-stage heat regenerator equipped with a housing enclosing a fluid-porous heat regenerative media bed. A first gas passageway in the housing directly interconnects the gas channel and the lower surface of the media bed. A second gas passageway in the housing interconnects an opening in the housing communicating with the exterior and the upper surface of the media bed. This arrangement allows hot waste combustion gases to pass upwardly through the media bed so that any condensable contaminant in the gases condenses to a liquid and flows out of the bed under gravity before becoming solid and clogging the bed. The liquid contaminant may then be removed from the regenerator from a position below the media bed.

27 Claims, 9 Drawing Sheets

(56) References Cited

U.S. PATENT DOCUMENTS

| | | | |
|---|---|---|---|
| 4,807,695 A | 2/1989 | Ward | |
| 4,898,530 A * | 2/1990 | Wills et al. | 431/11 |
| 4,909,727 A * | 3/1990 | Khinkis | 431/10 |
| 4,923,391 A | 5/1990 | Gitman | |
| 4,944,670 A | 7/1990 | Watson | |
| 4,957,430 A * | 9/1990 | Goodfellow | 432/28 |
| 5,217,373 A | 6/1993 | Goodfellow | |
| 5,352,115 A | 10/1994 | Klobucar | |
| 5,569,031 A * | 10/1996 | Heed | 431/170 |
| 5,571,006 A * | 11/1996 | Nakamachi et al. | 431/11 |
| 5,664,942 A | 9/1997 | Bayer | |
| 5,755,569 A | 5/1998 | Berg et al. | |
| 5,770,165 A | 6/1998 | Truppi et al. | |
| 5,791,299 A * | 8/1998 | Matsuo et al. | 122/367.1 |
| 6,039,109 A | 3/2000 | Chagnot et al. | |
| 6,302,188 B1 * | 10/2001 | Ruhl et al. | 165/10 |
| 6,423,275 B1 * | 7/2002 | D'Souza | 422/129 |
| 6,576,198 B2 * | 6/2003 | Cash | 422/173 |
| 7,332,136 B2 * | 2/2008 | Heed | 422/179 |
| 8,226,405 B2 * | 7/2012 | Dong et al. | 431/215 |
| 2002/0072020 A1 | 6/2002 | Crane et al. | |
| 2006/0093978 A1 | 5/2006 | Simard et al. | |
| 2006/0133973 A1 * | 6/2006 | Saares | 422/239 |
| 2007/0160943 A1 * | 7/2007 | Lex | 431/215 |
| 2009/0068338 A1 * | 3/2009 | Lange et al. | 426/629 |
| 2010/0050691 A1 * | 3/2010 | Ward et al. | 65/29.13 |
| 2011/0081277 A1 * | 4/2011 | Balon et al. | 422/175 |
| 2013/0011805 A1 * | 1/2013 | Ward et al. | 432/13 |

FOREIGN PATENT DOCUMENTS

| | | | |
|---|---|---|---|
| GB | 2 209 386 A | | 5/1989 |
| JP | 10153307 A * | | 6/1998 ............. F23D 14/66 |
| WO | WO 2006/047857 A1 | | 5/2006 |
| WO | WO 2009/067327 A1 | | 5/2009 |

OTHER PUBLICATIONS

Canadian Intellectual Property Office, International Search Report, Feb. 23, 2012, PCT/CA2011/050787 (Novelis Inc. et al.).

International Patent Application No. PCT/CA2011/050787, International Preliminary Report on Patentability, mailed Jul. 4, 2013, 6 pages.

European Patent Application No. 11 851 395.1, Extended Search Report mailed Oct. 7, 2014, 7 pages.

Chinese Application No. 201180062392.9, Office Action dated Dec. 3, 2014 and English Translation, 22 pages.

Canadian Application No. 2817357, Office Action mailed Dec. 8, 2014, 5 pages.

* cited by examiner

REVERSE FLOW REGENERATIVE APPARATUS AND METHOD

CROSS-REFERENCE TO RELATED APPLICATION

This application claims the priority right of prior provisional patent application Ser. No. 61/460,049 filed on Dec. 23, 2010 by applicants named herein. The entire contents of application Ser. No. 61/460,049 are specifically incorporated herein by this reference.

BACKGROUND OF THE INVENTION (1) Field of the Invention

This invention relates to reverse flow heat-regenerative burner apparatus used for heating furnaces and the like while limiting heat losses. More particularly, the invention relates to methods and apparatuses that address problems of contamination of the heat exchange media used in such apparatuses.

(2) Description of the Related Art

Combustible fuel burners are often employed for heating furnaces intended for melting metals, such as scrap aluminum, glass and other materials. The burners require a supply of combustion air and generate a substantial volume of hot combustion gases that are directed into the furnace. Regenerative burners are designed to improve fuel efficiency by recycling heat from combustion gases exiting the furnace that would otherwise go to waste. Usually, two fuel burners are used in tandem and are associated with two fluid-porous bodies of heat-absorptive material, usually media beds made of particles of refractory material. The media beds absorb heat from, or deliver heat to, gas passing through the beds depending on the relative temperatures of the gas and the beds at the time of contact. As a first of the two burners is operated, the waste combustion gas that it generates is eventually withdrawn from the furnace and passed through a second one of the media beds to heat the media. Combustion gas, normally air, for the first burner is at the same time drawn through a first media bed where it is heated by media already hot from a prior burner cycle. After a period of time intended to maximize efficiency (often 30 seconds to three minutes), the first burner is turned off and the second burner is ignited. Combustion gas for the second burner is then drawn through the second media bed (the one previously heated by the waste gas from the first burner), and waste combustion gas from the second burner is withdrawn from the furnace and passed through the first media bed so that it is heated once again. By cycling the burners in this way, waste heat is captured to a large degree and is redirected back into the furnace so that the furnace is operated with improved efficiency. Clearly, it is possible to use more than two burners per furnace provided the waste gases from one group of burners are used to pre-heat the combustion gases from another other group by means of associated regenerative media beds, or the burners may be operated in pairs, with the pairs having different heating cycles from each other.

A disadvantage of regenerative burners used in this way is that their associated media beds often become contaminated by components in the waste gases taken from the furnace and passed through the beds. The nature of the contaminants depends on the material being heated in the furnace. For example, when the furnace is used for remelting scrap aluminum, salt fluxes are often added to facilitate the melting of the metal and to avoid undue metal oxidation. The salt fluxes partially vaporize at the furnace operating temperatures and subsequently condense in the media beds, thereby restricting gas flow through the beds and eventually blocking them. The vaporized salt fluxes initially condense as liquids but eventually solidify as they progress through the beds to cooler regions. This problem is well recognized in the prior art, and many attempts have been made to solve the problem by removing the contaminating deposits in one way or another.

United States published patent application No. 2002-0072020 (to Crane et al., published on Jun. 13, 2002) discloses a typical burner/media bed combination of the type used in metal melting furnaces. The publication discloses a convenient way for replacing an entire media bed when it has become contaminated to an unacceptable extent. The media bed thus removed is replaced with minimal delay by a spare media bed that contains new, renovated or otherwise decontaminated media.

U.S. Pat. No. 4,944,670 (to Watson, issued on Jul. 31, 1990) discloses a two-burner furnace with regeneration beds that may be used in an aluminum melting facility. The patent notes that the beds become contaminated with salts, etc., and discloses a control system that periodically allows the beds to be headed to an elevated temperature to melt the adsorbed salts which can then be collected and discarded.

U.S. Pat. No. 4,807,695 (to Ward, issued on Feb. 28, 1989) discloses a design of regenerator for use in a regenerative burner system for melting glass or non-ferrous metals. The invention provides an inlet for adding clean refractory balls (the media particles of the bed) at one end of the bed, and means for removing contaminated balls at the other end. In this way, contaminants are removed as the bed is refreshed.

U.S. Pat. No. 4,923,391 (to Gitman, issued on May 8, 1990) discloses a regenerative burner control system for aluminum melting in which provision can be made for bypassing the regenerative bed at certain stages of the heating cycle when contaminants are particularly high. Contamination of the bed can therefore be reduced.

British patent application GB 2 209 386 A (to Wills, et al., published on May 10, 1989) discloses a regenerative burner system for glass melting where provision is made for use of an intermediate cooling stage (between two regenerative beds) so that contaminants can be condensed in a duct section that is easy to clean.

British patent application GB 2 192 264 A (to Goodfellow, published on Jan. 6, 1988) discloses a regenerative burner system in which a regenerative bed is arranged in two parts in such a manner that the gas passes downwardly through the first part and then upwardly through the second part. The temperature profile is arranged so that the contaminated zone is positioned close to the lowermost layer of the first part of the bed, whereupon relatively small changes in the temperature profile result in movement of the blocking material from the first part of the bed in a molten state. The contaminants are collected and discarded.

US patent publication no. 2006/0093978 A1 of May 4, 2006 discloses a method and apparatus for cleaning a media bed by introducing a rapid flow of a decontaminating gas through the media bed from below to cause the particles to move relative to each other to dislodge solid contaminants.

While these solutions to the problem may be effective in some ways, they nevertheless have disadvantages, such as requiring expensive modification of the apparatus or frequent replacement of the media. There is therefore a need for other ways of dealing with contamination of the media that reduces gas flow through regenerative beds, particularly when the combustion gases contain condensable contaminants.

BRIEF SUMMARY OF THE INVENTION

One exemplary embodiment of the invention provides a regenerative burner apparatus. The apparatus includes a burner housing, preferably housing a combustible-fuel burner, having a gas channel extending therethrough, and a single-stage heat regenerator equipped with a housing enclosing a fluid-porous heat regenerative media bed having an upper surface and a lower surface. The housing has an opening communicating with the exterior of the apparatus, usually (although not essentially) via additional tubing, pipes or vents. A first gas passageway in the housing directly interconnects the gas channel of the burner housing and the lower surface of the heat regenerative media bed. A second gas passageway in the housing interconnects the opening in the housing communicating with the exterior and the upper surface of the heat regenerative media bed. The first and second gas passageways are in communication with each other substantially only through the heat regenerative media bed so that gas passing from one gas passageway to the other must flow through the media bed. Of course, in practice, some gas leakage around the media bed, if insignificant to the overall efficiency of the apparatus, may occur.

It is pointed out that the term "single-stage" as used herein to describe a media bed or regenerator means that heat is exchanged with refractory media only in a single continuous and unbroken zone of heat transfer. This is in contrast to dual or multi-stage media beds or regenerators, for example of the kind shown in reference GB 2 192 264 A (mentioned above) in which two media beds are provided with a separation formed by a channel leading from one media bed to the other.

This arrangement allows hot waste combustion gases to pass upwardly through the media bed so that any condensable contaminant in the gases condenses to a liquid in the media bed and flows out of the bed under gravity before becoming solid. The liquid contaminant may then be removed from the regenerator from a position below the media bed. Therefore, as hot combustion gases are exhausted from a furnace or the like via the first opening and through the media bed, the condensed contaminants flow under gravity towards the hotter surface of the media bed (the lower surface at the time being heated by the hot combustion gases) rather than the cooler upper surface, and thus have a reduced likelihood of freezing and solidifying before they exit the media bed.

As noted, the first channel connects the first opening directly to the lower surface of the fluid-porous body. By the term "directly" we mean that gases passing through the channel do not encounter any object or apparatus that exchanges significant amounts of heat with the gases except for heat that naturally escapes from the sides of the channel. Hence, when hot waste combustion gases are passing through the first channel, the combustion gases fully laden with vaporized contaminants are led directly to the lower surface of the fluid-porous body without losing an amount of heat likely to cause significant condensation of vaporized contaminants before the gases enter the fluid-porous body through its lower surface.

Preferably, the housing includes a liquid collection chamber directly beneath the lower surface of the heat regenerative media bed, which may include a sump in a bottom wall of the chamber, optionally covered with a perforated cover plate or left uncovered. The chamber or sump may be provided with a liquid-removal outlet, optionally provided with a removable closure so that liquid contaminants may be removed periodically. Alternatively, the outlet may optionally be connected to an open drain tube for continuous removal of contaminants.

The media bed may be in the form of a packed bed of discrete particles, e.g. spheres or other regular or irregular shapes, of refractory material. Alternatively, the media bed may be a fluid-permeable solid provided with channels or interconnected pores.

The housing of the regenerator is preferably made in two parts, i.e. a lower part retaining the heat regenerative media bed and an upper part detachable from the lower part. The two parts are preferably joined together with at least one hinge at one side of the housing, and a releasable fastener, e.g. connection bolts, may be provided at the opposite side to keep the parts together until access to the media bed is required.

The housing of the regenerator preferably has a layer of heat insulating refractory material lining at least the first passageway.

According to another exemplary embodiment, there is provided a single stage regenerator for a regenerative burner apparatus, the regenerator comprising: a housing enclosing a fluid-porous heat regenerative media bed having an upper surface and a lower surface, the housing having an opening communicating (directly or indirectly) with an exterior of the apparatus and a port adapted for connection with a burner housing; a first gas passageway in the housing directly interconnecting the port and the lower surface of the heat regenerative media bed; and a second gas passageway in the housing interconnecting the opening in the housing communicating with the exterior and the upper surface of the heat regenerative media bed, the first and second gas passageways being in communication with each other only through the heat regenerative media bed.

According to yet another exemplary embodiment, there is provided a method of heating a furnace containing a charge to be heated and a vaporizable contaminant, wherein at least two regenerative burner apparatuses are used alternately to introduce heated combustion gases into the furnace and to recover heat from waste combustion gases vented from the furnace, and wherein the at least two regenerative burner apparatuses each employ a single stage heat regenerative burner bed having an upper surface and a lower surface, which method comprises alternately passing hot combustion gases from the furnace and then external combustion air through the heat regenerative media beds, wherein the hot combustion gases from the furnace are passed upwardly through at least one of the beds from the lower surface to the upper surface thereof, and the external combustion air is passed downwardly through at least one of the heat regenerative beds from the upper surface to the lower surface thereof; and wherein the contaminant in liquid form is removed from the apparatuses beneath at least one of the heat regenerative media beds thereof.

In all embodiments of this invention, it is preferable to ensure that the gas flow through the media bed is optimized to avoid the deposition of solid contaminants as much as possible. It has been observed that, if the porosity of the grating supporting the media bed is low, the condensed liquid salt may not be fully draining and therefore solidified contaminants may eventually plug the bed. In fact, it is theorized that the problem may be caused by generally too little porosity in the grating combined with too strong a gas flow during the exhaust part of the cycle. When the burner is inactive and exhaust gas from the furnace is flowing through the media bed, the gaseous salt entrained in the exhaust turns into a liquid on contact with the bed media. However, a significant portion of the salt is prevented from draining away due to the area of the openings in the grating being too small in relation to the area of the solid portion of the grating. Exacerbating the problem may be the significant strength of the exhaust gas flow during this part of the cycle, tending to push the salt further into the bed. The combination of these two factors over time may cause the salt to build up to the point where it can penetrate up to a third of the bed thickness (from the bottom), to a location cold enough for it to freeze and form a solid crust.

This problem may be overcome by increasing the porosity of the grating when necessary, i.e. if the problem becomes apparent with a particular design of regenerator apparatus and grating. The open area of the grating as a percentage of the total area covered by the grating (in plan view, i.e. at the upper surface of the grating) is preferably in the general range of 30-90%, and more preferably 40 to 70%.

Another factor relating to this issue is the porosity of the media bed itself, which is affected by the size of the particles making up the media bed, and the interplay between the porosity of the grating and the porosity of the media bed. First of all, the openings of the grating are preferably elongated rather than round so that they cannot be completely closed by a spherical particle of the media bed. The actual length to width ratio of the openings is optional, but in general the openings are usually at least twice as long as they are wide, and more preferably at least five times as long as they are wide. Of course, not all of the openings are necessarily of the same size and shape and it is often advantageous to employ openings of different sizes and shapes to accommodate the positioning of the supporting struts and for other design reasons.

Another consideration is that, as the width of the openings is increased, particles of the media bed may seat lower into the openings from above, thus presenting a larger cross section of solid material at the upper end of the opening, and thus greater resistance to gas flow. Compensation for this can be made by increasing the size of the particles, but this may affect the overall porosity of the media bed. For example, it is found that when the media bed is made of spheres, e.g. of alumina or other ceramic, having a diameter of one inch (25.4 mm) and the openings have a width of 0.88 inch (22 mm) rather than 0.75 inch (19 mm), the spheres tend to seat lower in the wider openings, lessening the "effective" open area when media is present in the opening. To compensate, larger size spheres of more than 1 inch to 1.5 inch (25.4 to 38 mm) diameter may be used. It is estimated that the larger spheres would increase the effective porosity by about 40%.

As previously mentioned, the strength of the gas flow during the exhaust phase of the cycle also has an impact on the problem of solid build-up in the bed. The exhaust gas typically has a gas velocity of about 1,890 ft/min (576 m/min) at the media bed/grating interface, and this may be strong enough to impede the flow of salt from the bed. The gas flow at this location is affected directly by the porosity of the grating; i.e. the higher the porosity of the grating, the lower the gas velocity. When the porosity of the grating is increased, the same volume flow of gas moves at a slower rate through what amounts to the equivalent of an opening having a larger cross-sectional area. In theory, in a basic embodiment, the gas flow at the media bed/grating interface may vary anywhere from about 100 to 2,000 ft/min (30.5 to 609.6 m/min), and the media bed would still function effectively. At 100 ft/min (30.5 m/min), good salt drainage could be expected over a broad range of grate porosities, while at 2,000 ft/min (609.6 m/min), the amount of salt draining from the bed would be sharply limited. Combined with an open grating design, a preferred gas velocity is from 800 to 1,300 ft/min (243.8 to 396.2 m/min), a range in which good drainage, would be balanced against optimum furnace/media bed performance.

In cases where the design of the grating is found to provide too little porosity, and until a more porous grating can be substituted, the deposition of solid can be minimized by the following procedure. This involves periodically reducing the burner firing rate to reduce the velocity of the exhaust gas velocity. Burners operate in pairs and typically cycle every minute or every few minutes. The procedure involves reducing the combustion gas flow through a pair of burners by 30% for a short period (e.g. 2-8 minutes, more preferably about 5 minutes) out of every hour of operation. This provides extra time for the salt that accumulates over each hour to drain from the media beds. In larger furnaces having multiple pairs of burners, the periods of reduced burner output may be sequenced so that no two periods overlap. This procedure may be considered a permanent solution to the problem, or a temporary measure until a more porous grating can be installed.

BRIEF DESCRIPTION OF THE SEVERAL VIEWS OF THE DRAWINGS

Exemplary embodiments of the invention are described in detail in the following with reference to the accompanying drawings, in which.

DETAILED DESCRIPTION

In the following description, like or equivalent elements throughout the several views of the drawings are identified by the same reference number. However, the use of a single reference number to identify elements in different views should not be taken to imply that the elements are necessarily identical. Any differences will be apparent from the description and from the drawings themselves.

Figure 1:
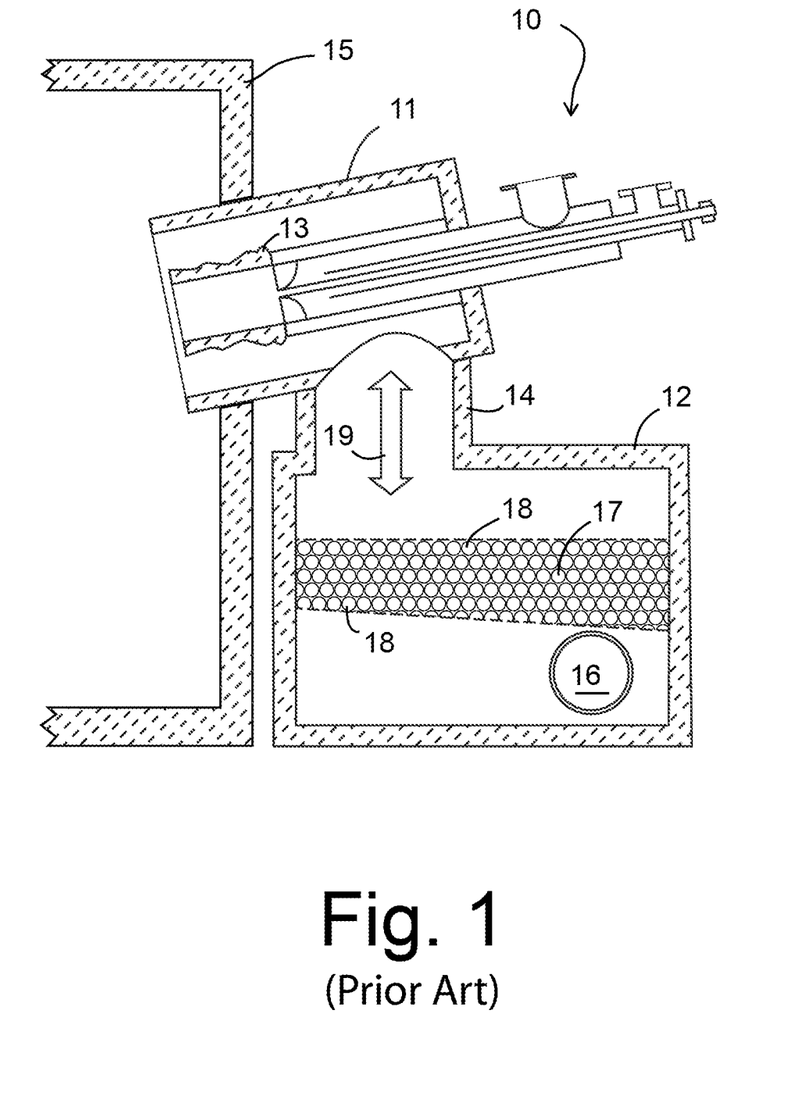
FIG. 1 is a schematic vertical cross-section of a conventional regenerative burner apparatus and part of an associated furnace provided for comparison purposes; the apparatus includes a combustible fuel burner for directing hot combustion gases into the furnace.

FIG. 1 shows a conventional heat regenerative fuel burner apparatus of the kind shown in US publication no. 2002-0072020 A1 to Crane et al. mentioned above (the disclosure of which publication is specifically incorporated herein by this reference). As stated earlier, the illustrated burner apparatus works in conjunction with a second identical or similar apparatus. The burner apparatus is indicated generally by reference numeral 10. The apparatus includes a burner housing 11 enclosing a fuel burner 13, and a regenerator 12 interconnected to the burner housing 11 by a tubular element 14. The burner housing 11 projects into a furnace 15 (shown only in part) to direct hot combustion gases from the burner 13 into the furnace interior when the burner unit 13 is ignited and operating. The furnace 15 may be one used, for example, for melting or alloying metals, particularly aluminum and aluminum-based alloys, and which contains a vaporizable salt flux. During a heating operation, combustion air from the exterior of the apparatus is drawn into the regenerator 12 through a combustion air opening 16 and flows through the tubular element 14 to the burner housing 12 to provide oxygen for the burner 13. Following this path, the combustion air is caused to flow through a heat regenerative media bed 17 made up of a collection of discrete refractory particles 18, preferably spheres. If the particles are hot from a previous cycle, the combustion air will pick up heat from the spheres and will carry the heat into the furnace. When the burner 13 is not operating, the burner housing 11 acts as an outlet for hot waste combustion gases from the furnace 15, i.e. the hot waste combustion gases introduced into the furnace by a companion regenerative burner apparatus (not shown) operating a combustion cycle. The hot waste combustion gases flow from the burner housing 12 to the opening 16 and, in doing so, pass through the media bed 17 and transfer heat to the particles 18 to raise their temperature for the next cycle of combustion air input. Hence combustion air and waste combustion gases flow alternately through the tubular element 14 as represented by the double-headed arrow 19. During the time when the burner 13 is inactive, the hot waste combustion gases pass downwardly through the media bed 17 and are cooled. When the burner 13 is active, cool combustion air passes upwardly through the media bed and is heated.

A problem associated with this design is that contaminants in the hot waste combustion gas from the furnace are deposited within the media bed 17 and restrict the flow of gases through the bed and may eventually block the bed entirely. There is a particular problem when the waste combustion gas contains condensable contaminants such as vaporized salt flux. As the waste combustion gases pass downwardly through the bed, the salt flux condenses to a liquid, and the liquid flows under the action of gravity and gas pressure to lower parts of the media bed where temperatures may be cool enough to cause the liquid to solidify and form a solid deposit. The solid deposit tends to block the gaps between the particles, possibly binding the particles together, and may eventually stop the gas flow entirely.

Figure 2:
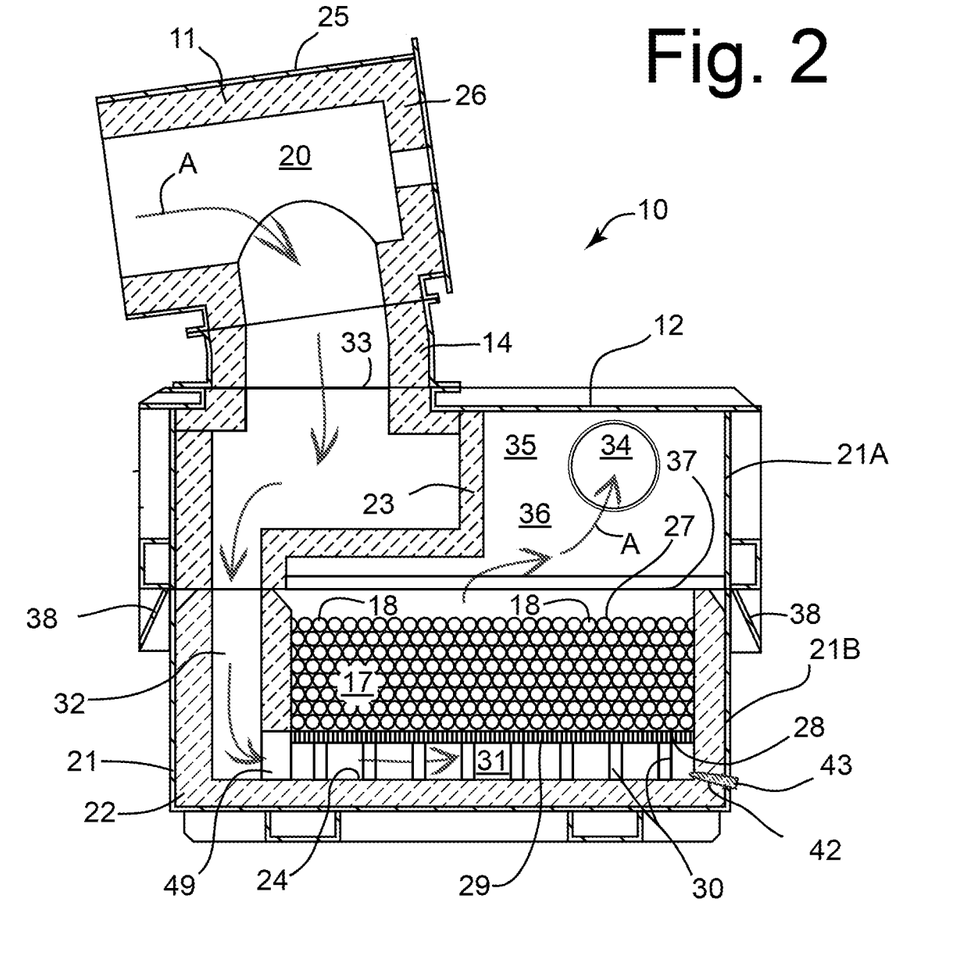
FIG. 2 is a vertical cross-section of one exemplary embodiment of a regenerative burner apparatus suitable for use with a combustible fuel burner, e.g. of the kind shown in FIG. 1.

FIG. 2 shows one exemplary embodiment of the present invention. The figure shows a regenerative burner apparatus 10 in vertical cross-section. The apparatus has a burner housing 11 and a heat regenerator 12 interconnected by a tubular element 14. The apparatus is illustrated without a burner for the sake of simplicity but would in operation be provided with a burner, such as burner 13 shown in FIG. 1, in the burner housing 11. The burner housing 11, which has an outer metal shell 25 provided with a refractory lining 26, defines a gas channel 20 that communicates with the interior of the tubular element 14. The heat regenerator 12 has a regenerator housing 21 made of metal and provided with a refractory lining 22 on at least those interior surfaces that would otherwise come into contact with hot gases. The refractory lining 22 provides thermal insulation to minimize heat losses from the housing and prevents the hot gases from corroding the housing interior. Also, a divider wall 23 made of refractory material physically and thermally separates hot gases from cooler gases during operation of the apparatus. The lower part of divider wall 23 has an opening 49 near a lower surface 24 of the housing 21. The housing 21 encloses a fluid-porous single-stage heat regenerative media bed 17 made up of layers of individual refractory particles 18, preferably spheres, forming a fluid-porous body that allows gases and liquids to pass therethrough. It should be noted that, while a bed of discrete refractory particles is preferred in this exemplary embodiment, other fluid-porous bodies may be used instead in this and other embodiments, e.g. a unitary body of refractory material having numerous narrow channels passing therethrough or containing interconnected hollow cells distributed throughout the body. The media bed 17, which has an upper surface 27 and a lower surface 28, is supported on a perforated support formed by a refractory grating 29 held above the bottom surface 24 of the regenerator housing by a series of mutually spaced generally upright refractory supporting struts 30. The space occupied by the struts 30 below the media bed 17 forms a lower (hot gas) chamber 31 that, in use, is filled with hot gases, i.e. either waste combustion gases from the furnace or hot combustion air from the media bed depending on the operational status of the burner. This hot gas chamber forms part of a first (hot gas) passageway 32 in the regenerator 12 that directly interconnects a burner housing port 33 with the lower surface 28 of the media bed via the opening 49 in divider wall 23. In turn, the port 33 communicates with the interior of the tubular element 14, the gas channel 20 of the burner housing 11, and ultimately the interior of a furnace (not shown). Thus, hot gases are fed directly between the furnace and the lower surface 28 of the media bed 17 through the first gas passageway 32 which is adapted (by virtue of the continuous refractory lining) to minimize temperature drops along the way. The first gas passageway 32 is unobstructed and, since the apparatus employs a single-stage media bed 17, does not contain a further media bed or part of such a bed or other equipment that would cause a significant change of temperature of the gases passing through the passageway.

The regenerator housing 21 includes an opening 34 above the media bed 17 communicating with the exterior of the apparatus for introduction of combustion air into the housing or for the removal of cooled combustion gases from the housing according to the operational status of the burner unit. The opening 34 may be connected to piping (not shown) leading to a vent positioned in a suitable place, e.g. high on an exterior wall of a furnace building. Furthermore, environmental protection equipment may optionally be connected to the piping to eliminate harmful components of hot waste combustion gases passing therethrough. The interior of the regenerator housing 21 above the media bed 17 forms an upper (cool gas) chamber 35 that in use is filled with cool gases, i.e. either the combustion air from the exterior or the waste combustion gases cooled by their passage through the media bed 17. The upper chamber 35 acts as a second gas passageway 36 in the regenerator housing 21 directly interconnecting the upper surface 27 of the media bed and the opening 34 communicating with the exterior.

In the exemplary embodiment, the cool gas chamber 35 is positioned directly above the media bed 17 and the hot gas chamber 31 is positioned directly below the media bed, and the first gas passageway 32 (including the chamber 31) and second gas passageway 36 (including the chamber 35) communicate with each other only through the porous heat regenerative media bed 17.

As shown by the arrows A in FIG. 2, during the time when the burner unit attached to the regenerator 20 is inactive, hot waste combustion gases from the furnace enter the gas channel 20 in burner housing 11, pass through the tubular element 14 and enter the regenerator housing 21 via the port 33, pass through the first gas passageway 32, through opening 49 into the lower chamber 31, between the struts 30 in the lower chamber 31, into the media bed 17 through its lower surface 28, out of the media bed through its upper surface 27 into the upper chamber 35 forming the second gas passageway 36 and then through the opening 34 to the exterior. When the burner unit is operational, the flow of gas is in the opposite direction with combustion air from the exterior flowing through the media bed 17 while passing from the opening 34 to the port 33 and from there through to the burner housing 11.

When a hot combustion gas is flowing through the regenerator 12, the gas passes upwardly through the media bed 17. The lower surface 28 thus becomes the hotter surface of the bed and the upper surface becomes the cooler surface as the gas is cooled by contact with the refractory particles 18. The temperature of the media bed thus decreases in the upward direction. When the waste combustion gas contains a vaporized contaminant, such as salt flux, the contaminant condenses as a liquid at a height in the media bed where the temperature falls below the condensation temperature of the contaminant. If all of the contaminant that is capable of condensing changes to liquid at this height in the bed, then waste gas moving higher in the bed contains no further condensable contaminant, so no solid contaminant will form there even if the temperature of the bed falls below the solidification temperature of the contaminant. Nevertheless, even if a small amount of condensable contaminant remains in the waste gas as it rises past the height were condensation to liquid takes place and enters a region where the temperature falls below the solidification temperature of the contaminant, only a small amount of solid form will form as the majority of the contaminant will remain in the region causing condensation to liquid. Additionally, if the contaminant that has condensed to liquid is capable of flowing under the effect of gravity, it will flow downwardly through the media bed towards the hotter lower surface 28 and will eventually seep or trickle out of the media bed. The contaminant will remain as a liquid without any solidification because the chamber 31 under the media bed always remains hot. The liquid contaminant will eventually drain to the lower surface 24 of the housing where it will collect in chamber 31 as a pool. A sidewall of the housing is provided with a drain hole 42 near, or alternatively in, the lower surface 24 to allow collected contaminant in liquid form to be drained periodically from the housing. The drain hole 42 can be closed temporarily by a removable ceramic plug 43. Alternatively, the drain hole 42 may be connected to a discharge tube (not shown) provided for continuous drainage of the liquid contaminant. When the liquid contaminant is mostly condensed flux salt from the furnace, it may be recycled back to the furnace after a simple solidification and granulation step. Usually, no further refinement is necessary.

To make it even less likely that the contaminant will solidify in the media bed 17, the bed may be made of such a depth between the upper and lower surfaces 27, 28 that the temperature of the upper surface 27 remains above the solidification temperature of the contaminant at all times during the flow of hot combustion gases through the bed. If any contaminant remains in the waste gas as it passes through the media bed, it has no opportunity to deposit as a solid in the bed. Of course, the contaminant may then deposit as a solid on parts of the apparatus downstream of the media bed, but such deposits will not act to block the media bed itself. Such an arrangement is not, however, preferred as it runs contrary to the intention of transferring as much heat as possible from the waste combustion gas to the media bed, as the gas will exit the bed at a higher temperature than would otherwise be intended. However, this may still be desirable in circumstances where the deposit of solids would otherwise block the bed rapidly or lead to the need for frequent cleaning.

It should be kept in mind that when the hot combustion gas begins to flow through the media bed, the bed will be at a fairly low temperature throughout (as it will have been cooled by contact with combustion air from the exterior during the time when the burner was operational). Therefore, the contaminant may condense to a liquid and then form a solid during the initial stages of the flow of hot combustion gases until the media bed absorbs more heat from the gases. This is not harmful because, as the media bed heats up, any solid contaminant initially deposited is remelted and flows out of the bed under the effect of gravity. Moreover, the temperature profile in the media bed is expected to change from time to time (even during the constant flow of hot combustion gases through the bed), causing some degree of freezing and remelting. Overall, however, if any build up of solid does take place, it is normally remelted when the temperature profile changes again.

It is also of note that, although the hot waste combustion gases flow upwardly through the bed and may tend to drive condensed liquid contaminant higher in the bed towards a zone where the temperatures may be below the solidification temperature of the contaminant, the gas is working against gravity which makes it less effective in moving the liquid. Moreover, at the time when the burner is ignited, combustion air starts to flow through the media bed from top to bottom and, before it has had time to cool the bed significantly, it acts on the liquid contaminant in combination with the effect of gravity, to flush the liquid out of the lower surface of the bed.

Even with such advantageous effects, it is desirable to provide access to the media bed to allow for its periodic cleaning or replacement. For this reason, the regenerator housing 21 is made in two parts, an upper part 21A and a lower part 21B provided with a horizontal gas-tight line of separation 37. A short outwardly flared metal skirt 38 is provided around the lower edge of the upper part 21A to allow the upper part to be positioned correctly on the lower part. Normally, the two parts are securely held together, e.g. by connectors such as tie bolts or the like (not shown). The regenerative burner apparatus 10 is often elevated from the ground to provide heating at an upper location in the furnace. The upper part 21A of the housing is preferably supported by its connection to the burner housing 11 and other structural parts and remains in place on the furnace during changing of the media bed. However, when the connectors are removed, the lower part 21B may be dropped down by a mechanical device, e.g. hoist, a crane or a fork-lift truck, and moved away. Since the media bed 17 is positioned in the lower part 21B of the housing, it is completely accessible once the lower part 21B has been removed from the upper part. The lower part 21B may simply be inverted and the media dumped or the media bed may be contained within a wire basket or perforated box (not shown) so that it may be lifted out of the lower part 21B of the housing and replaced or taken away for cleaning.

In general, the size of the media bed is chosen according to the mass flow of gas that passes through the bed, the heat storage parameter of the heat-absorptive material, and the porosity of the bed (which determines the pressure drop across the bed between the lower and upper surfaces), etc. When the media bed made up of individual particles, the porosity is determined by the shape and size of the particles. As already noted, the particles are preferably spherical and preferably vary in size between 0.5 and 1.75 inch (13 to 44 mm), most preferably about 0.75 inch (about 19 mm) and are preferably made of alumina. The lower surface 28 of the bed may reach a temperature of up to about 1,100° C. when the burner is inactive and hot waste gases are channeled through the first gas passageway 32, and the lower surface will normally be at a temperature about 50° C. below that of the furnace itself due to inevitable (but small) heat losses through the walls of the housing. In contrast, the upper surface 27 of the bed may only reach a temperature of about 250° C., depending on the thickness of the bed, which is preferably about 15 to 20 inches (38 to 51 cm), most preferably about 16 inches (about 41 cm). The temperature drop across the thickness of the bed is normally approximately linear, which in a preferred example approximates to about 53° C./inch (about 21° C./cm). In such a case, the temperature would be at about 780° C. at a depth of about 6 inches (about 15 cm) above the lower surface of the bed, which is normally the maximum depth of penetration of the salt flux into the porous body from the lower surface. The flux salt normally used in a metal melting furnace (e.g. a mixture of sodium and potassium chloride) begins to condense to a liquid at a temperature of about 1,000° C. and freezes to a solid at its eutectic freezing point of about 645° C., which is below the minimum temperature of 780° C. expected at the maximum depth of penetration, so the flux remains liquid in the porous body. It is therefore believed that the flux will only penetrate into the porous body from the lower surface to a maximum depth of about 6 inches (about 15 cm).

Figure 3:
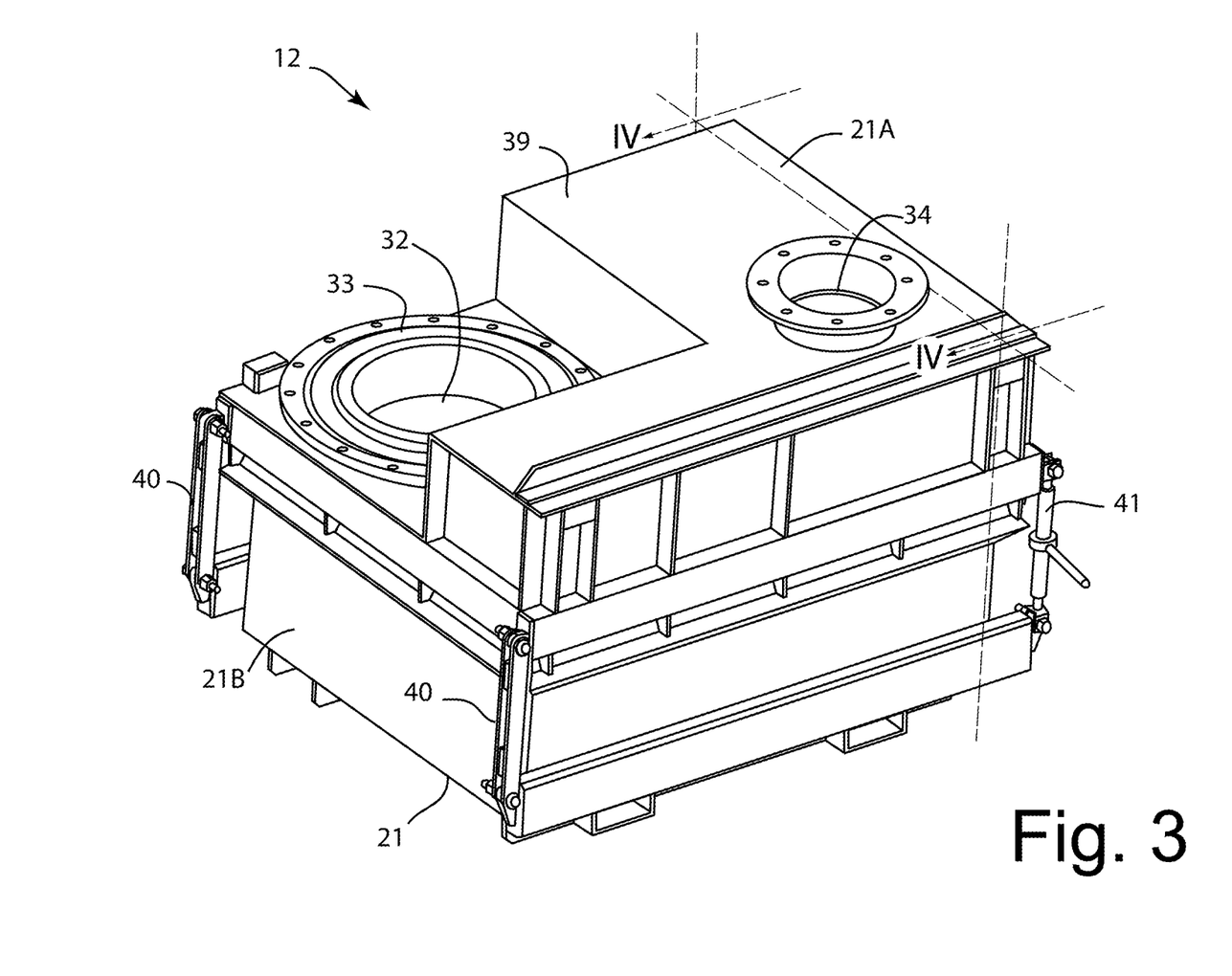
FIG. 3 is a perspective view of a heat regenerator according to another exemplary embodiment from which the burner housing has been removed for clarity.
Figure 4:
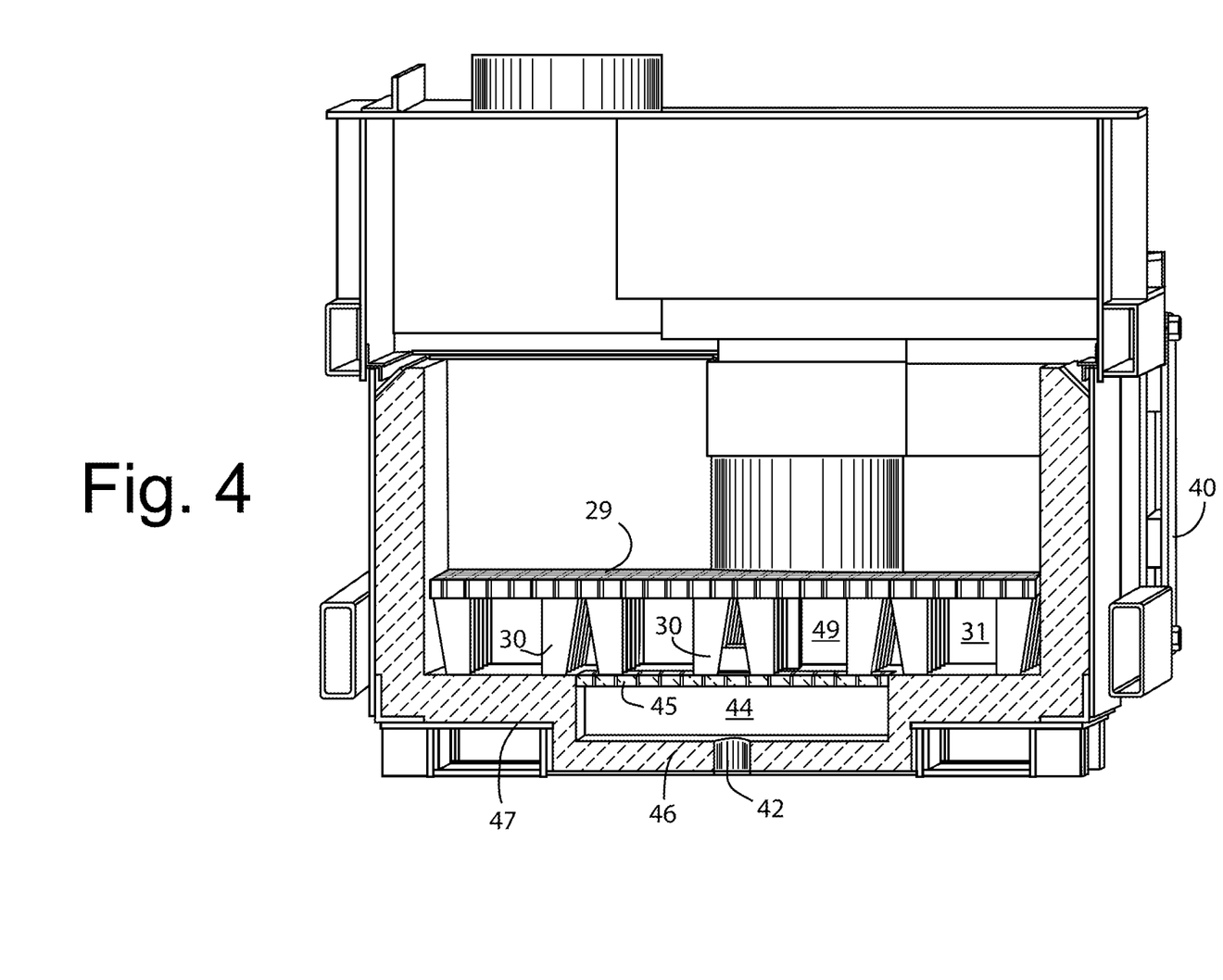
FIG. 4 is a vertical cross-section of the heat regenerator taken on the line IV-IV of FIG. 3.

FIGS. 3 and 4 show an alternative exemplary embodiment of a regenerator 12 which differs from that of FIG. 2 firstly in that the upper part 21A of the housing 21 is somewhat higher than part 21A of FIG. 2 to increase the size of the upper chamber above the media bed. Also, the port 33 and the channel 32 beneath the port have been reduced in height. Furthermore, the opening 34 to the exterior is located on an upper surface 39 of the housing 21 for greater convenience. Enlarged hinges 40 link the upper and lower parts 21A and 21B of the housing on one side of the regenerator and removable connection bolts 41 (only one of which is shown in FIG. 3) link the upper and lower parts on the opposite side of the housing. The bolts keep the housing parts together during operation of the apparatus, but can be quickly removed to allow the lower part 21B to be swung downwardly on the hinges 40 when access to the media bed is required.

FIG. 4 is a cross-sectional view (slightly in perspective) which, for simplicity, does not show the media bed but shows a perforated refractory grating 29 that supports the media bed and refractory supporting struts 30 for the grating located in the lower chamber 31. From FIGS. 3 and 4 it will be apparent that the grating 29, and therefore the media bed, occupies as much of the footprint of the housing as possible because the passageway 32 and gas port 33 are confined to just one corner of the housing. In this way, the media bed is provided with as much surface area as possible to maximize heat transfer.

Referring to FIG. 4, hot gases enter and leave the chamber 31 via an opening 49 beneath the grating 29 leading to passageway 32 and port 33 (see FIG. 3). In this embodiment, a small rectangular shaped sump 44 is provided in the bottom wall 47 adjacent to the rear wall (i.e. the wall opposite to the port 33) of the housing and is covered with a perforated cover plate 45 and provided with a central drain 42. The cover plate 45 is provided in this embodiment so that it may act as a secure base for struts 30 that support the grating 29, and it is perforated to allow liquid contaminants to flow through to the sump 44. In some cases, there may be a tendency for the holes in the perforated cover plate 45 to become blocked either by solid bodies in the liquid contaminants or by solidification of the contaminants themselves within or around the holes. In such cases, the struts may be designed so that they contact the lower wall 47 of the chamber around, but not directly over, the sump 44 and the cover plate 45 may then be omitted entirely leaving the sump open at the top. Alternatively, the regenerator design may be changed so that the position of the sump is moved slightly away from the rear wall of the chamber (towards the front wall of the chamber) by just enough distance to clear the back row of struts 30 normally positioned adjacent to the rear wall. Again, the cover plate 45 may then be omitted. The sump 44 extends only part way along the rear wall at the center and only a short way towards the front wall of the regenerator. A higher volume of waste combustion gases flow through the opening 49 at the front of the regenerator when the burner unit is not operating than the volume of combustion air flowing in the opposite direction through the opening 49 when the burner unit is operating. This tends to push liquid contaminants from the media bed towards the rear wall of the regenerator and the sump is located in this position to receive the liquid contaminants. The liquid contaminants collected in the sump may then be removed from the sump either at intervals or continuously through the drain hole 42. The drain hole 42 can be plugged with the plug being removed periodically to remove the accumulated liquid contaminants. In normal operation, it is necessary to drain the sump 44 only about twice per week and this may be done by placing a container under the drain hole 42. Of course, the frequency of drainage of the sump depends on the size of the furnace and the amount of salt flux (or other contaminant) added to the furnace. Alternatively, the drain hole 42 may be connected to an automated system (not shown) that continually drains the liquid contaminant away and reprocesses the contaminant for recycling.

The sump 44 is preferably provided with a layer of refractory insulation 46 to keep the contaminant hot enough to remain liquid prior to its removal from the housing. The provision of a sump in this way allows more liquid contaminant to be collected and allows the grating 29, and hence the media bed, to be kept low in the housing 21 to reduce the surface the area of the sidewalls of the housing with which the hot gases come into contact, thereby further minimizing heat loss.

In the alternative embodiments of FIGS. 5 through 13, the grating 29 is made up of an array of smaller units, referred to as "tiles", for ease of placement and removal and so that the area of the openings within the grating may be easily modified, if desired, by interchanging tiles of different designs. The tiles are preferably made of a refractory material, e.g. metal or ceramic.

Figure 5:
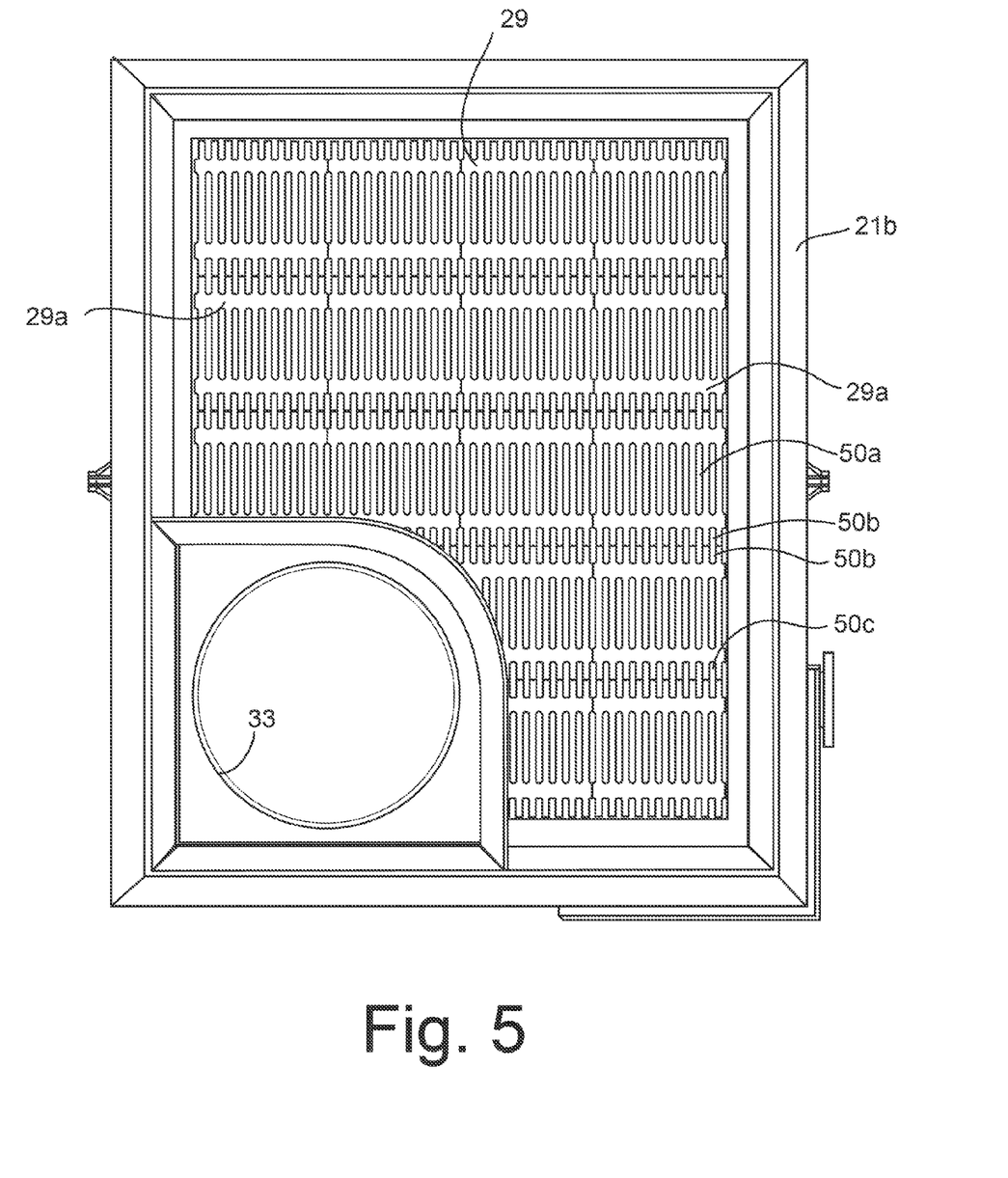
FIG. 5 is a plan view of a bottom portion of an alternative embodiment of a regenerator with the media bed removed showing the design of the supporting grating.
Figure 6:
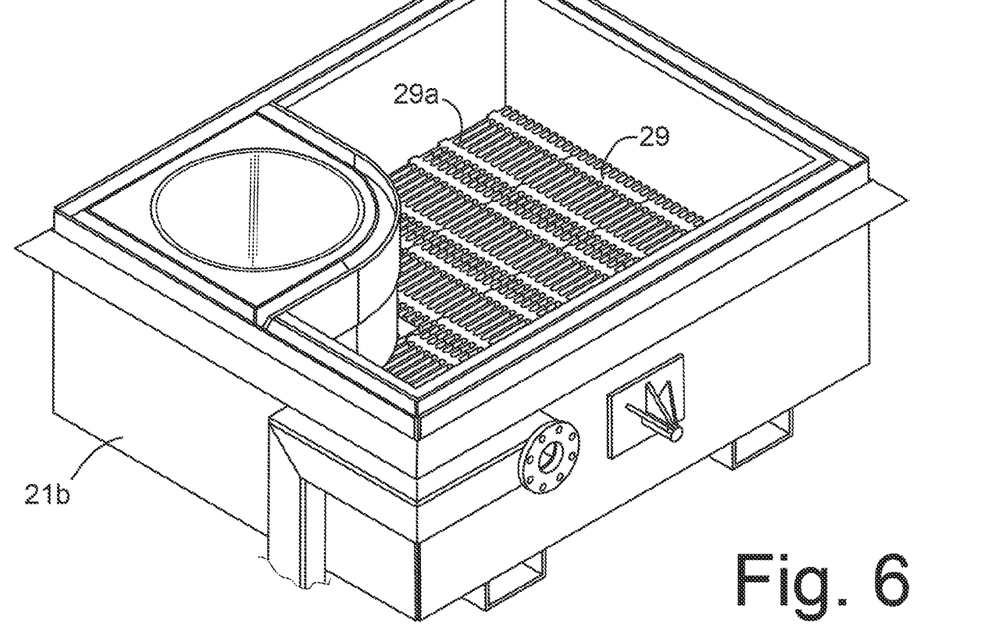
FIG. 6 is a perspective view of the embodiment of FIG. 5.
Figure 7:
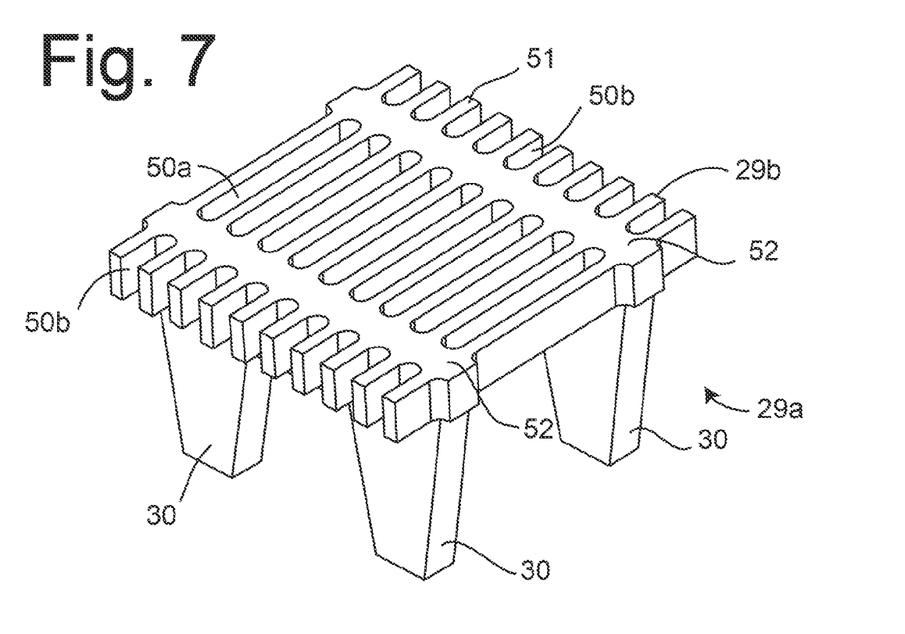
FIG. 7 is a perspective view of a grating tile used to form an array making up the grating shown in FIGS. 5 and 6.

A first embodiment of this kind is shown in FIGS. 5, 6 and 7. FIG. 5 is a plan view of a lower part 21b of a regenerator with the media bed removed to reveal the upper surface of the grating 29 beneath. FIG. 6 is a perspective view of the lower part 21b, and FIG. 7 is a perspective view of a square grating tile 29a of the kind used to make up the grating 29 when used in an array of identical tiles placed side-by-side. The grating tile 29a has a flat perforated plate 29b and four integral supporting struts 30. As shown in FIGS. 5 and 6, the tiles 29b are aligned with each other to form the grating 29 so that elongated openings 50a and 50b all line up in the same direction. Central openings 50a are closed around their peripheries, but end openings 50b are open to the adjacent sides of the tiles. The solid portions of the plate 29b separate the openings and effectively form elongated bars 51 between the openings and intersecting cross-bars 52. When used in an array, the end openings 50b of adjacent tiles combine to form combined openings 50c which, as shown, are somewhat shorter than central holes 50b. A grating made of such tiles has a porosity of about 46% (ratio of area of openings to that of the total surface area of the grating) at the top surface of the grating (i.e. at the grating/media bed interface).

Figure 8:
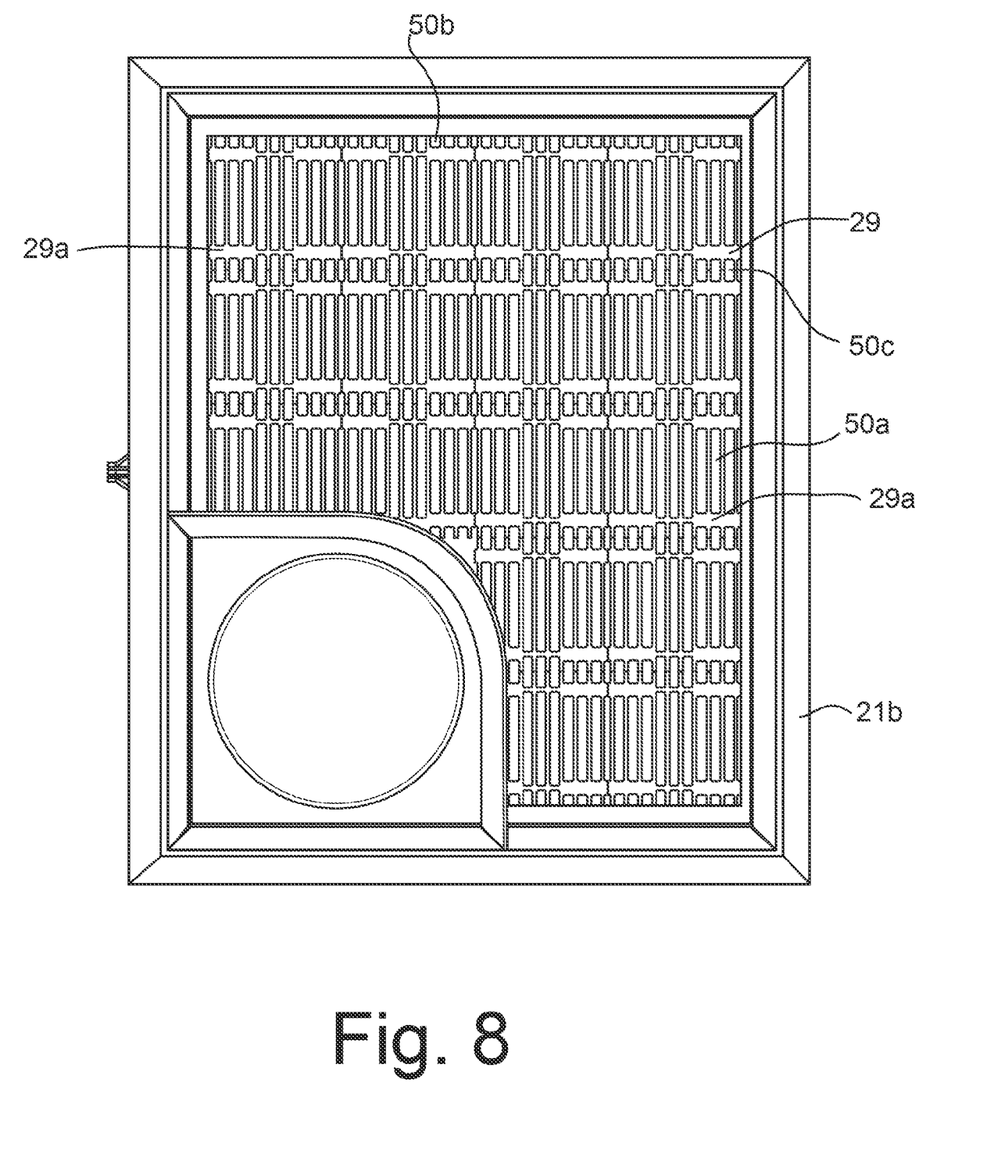
FIG. 8 is a top plan similar to that of FIG. 5 but of another alternative embodiment having a different grating design.
Figure 9:
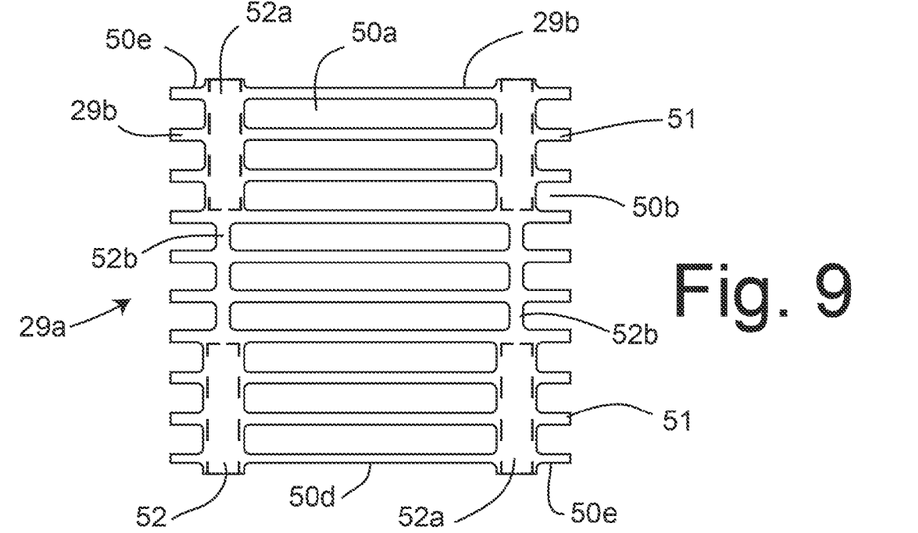
FIG. 9 is a top plan view of a grating tile used with identical tiles to make up the grating array shown in FIG. 8.
Figure 10:
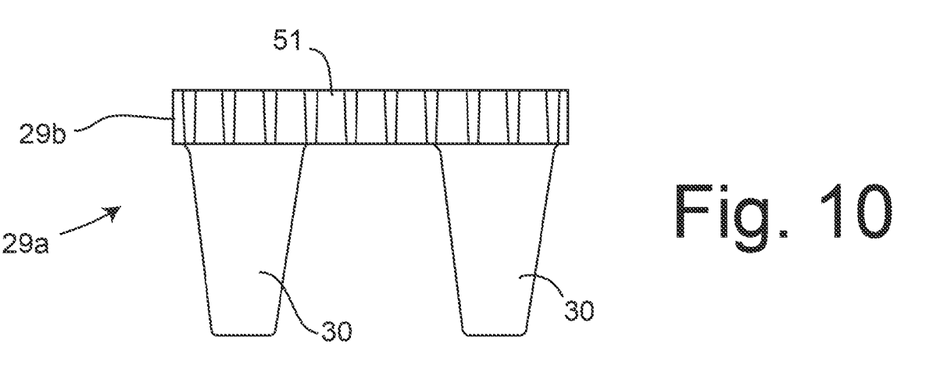
FIG. 10 is a side view of one side of the grating tile of FIG. 9.
Figure 11:
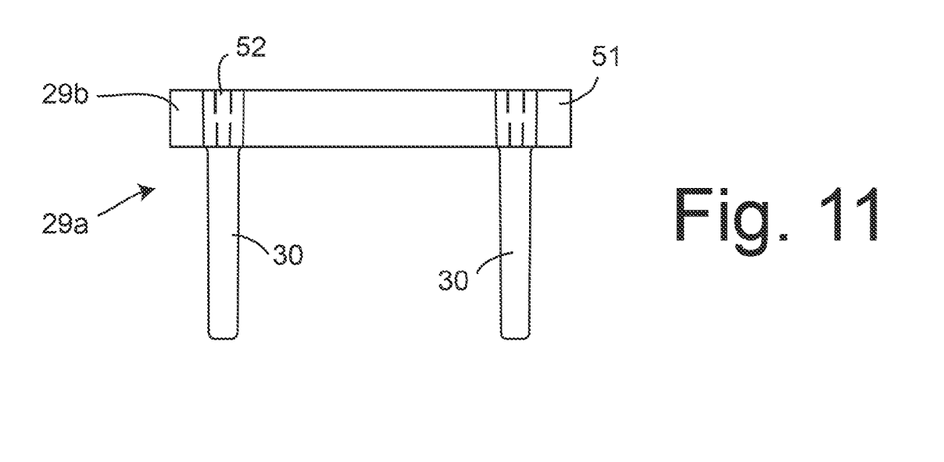
FIG. 11 is a side view of another side of the grating tile of FIG. 9.

The embodiment of FIG. 8 to 11 is similar to the previous embodiment, except that the design of the openings in the grating tiles has been changed to increase air flow through the grating 29. As best seen from FIG. 9, the central openings 50*a* and the end openings 50*b* have been elongated slightly and the bars 51 and cross-bars 52 have been reduced in thickness. In fact, the cross-bars 52 are wider immediately above the struts 30 in regions 52*a*, in order to provide the necessary support and strength, but are narrower in a central section 52*b* to elongate openings 50*a* and 50*b* in this region and to present a greater area of free space to increase gas flow. Also, as is the case for the tile of FIG. 7, the sides of the plate 29*b* parallel to the elongated openings 50*a* and 50*b* are sculpted to form recesses 50*d* and 50*e* that, when placed side-by-side with identical tiles, combine to form openings of approximately the same size and shape as openings 50*a* and 50*b*. FIG. 8 shows these tiles arranged to form a grating 29 within the bottom part 21*b* of a regenerator. The porosity of this design is approximately 57%. With this design (or another of similar porosity) and approximately 1.5 inch (38 mm) diameter spherical particles making up the media bed, the interface velocity of the exhaust gas may be lowered to about 1000 ft/min (304.8 m/min), thereby allowing for good drainage of the liquid contaminant.

Figure 12:
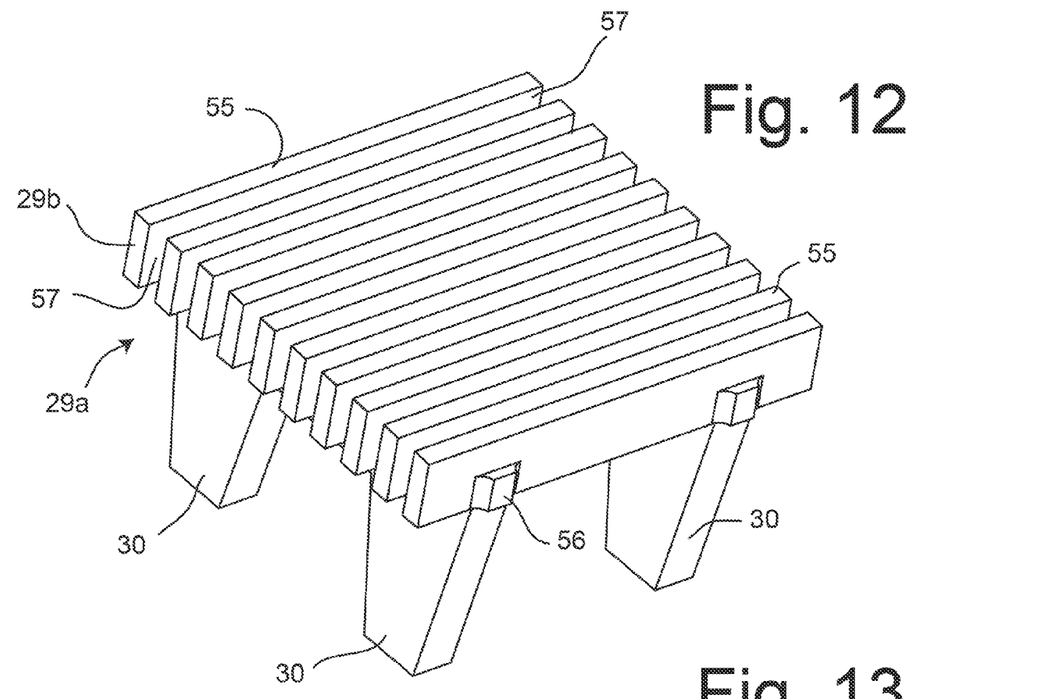
FIG. 12 is a perspective view of still another embodiment of a grating tile.
Figure 13:
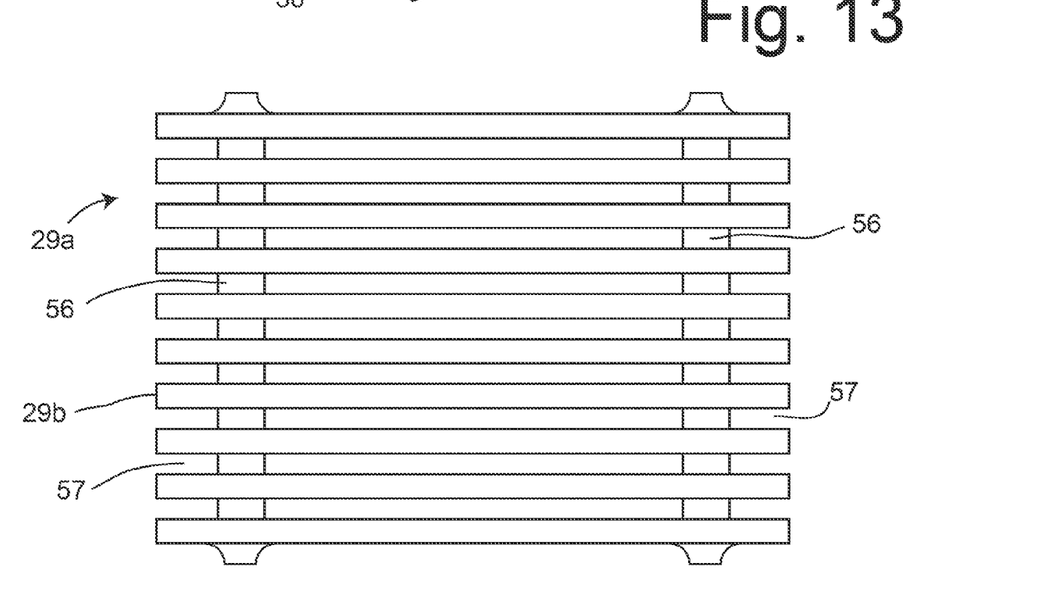
FIG. 13 is a top plan view of the grating tile of FIG. 12.

FIGS. 12 and 13 show, respectively, a perspective view and a plan view of yet another design of grating tile 29*a*. In this design, the plate 29*b* is made up of parallel bars 55 joined together by a pair of cross-rods 56 that hold the bars 55 together but with a spacing 57 between adjacent bars. The struts 30 are positioned beneath the cross-rods 56 to maximize support strength and to minimize resistance to air flow. This design is intended to maximize air flow through the grating 29 as much as possible without sacrificing the strength and durability of the grating. The porosity of this design may be as high as 70%, depending on the relative areas of the bars 55 and spacings 57.

It will be realized that other exemplary embodiments of the invention will be possible within the scope of the following claims.

What is claimed is:

1. A regenerative burner apparatus, comprising:
a burner housing having a gas channel extending therethrough;
a single-stage heat regenerator provided with a housing enclosing a fluid-porous heat regenerative media bed having an upper surface and a lower surface, said housing having an opening communicating with an exterior of said apparatus;
a first gas passageway in said housing directly interconnecting said gas channel of said burner housing and said lower surface of said heat regenerative media bed; and
a second gas passageway in said housing interconnecting said opening in said housing communicating with said exterior and said upper surface of said heat regenerative media bed, said first and second gas passageways being in communication with each other substantially only through said heat regenerative media bed,
wherein said heat regenerative media bed is supported on a porous support within said burner housing and wherein the porous support is held above a bottom surface of said housing by a plurality of generally upright struts.

2. The apparatus of claim 1, wherein said housing includes a liquid collection chamber directly beneath said lower surface of the heat regenerative media bed.

3. The apparatus of claim 2, wherein said liquid collection chamber includes a sump in a bottom wall thereof.

4. The apparatus of claim 3, wherein said sump has a perforated cover plate covering said sump.

5. The apparatus of claim 3, wherein said sump has a liquid-removal outlet provided therein.

6. The apparatus of claim 2, wherein said liquid collection chamber has a liquid-removal outlet provided therein.

7. The apparatus of claim 6, wherein said liquid removal outlet includes a closure element removably positioned therein.

8. The apparatus of claim 6, wherein said liquid removal outlet is connected to an open liquid drain tube.

9. The apparatus of claim 1, wherein said heat regenerative media bed comprises a packed bed of discrete particles of refractory material.

10. The apparatus of claim 9, wherein said discrete particles are spheres.

11. The apparatus of claim 10, wherein said spheres have a diameter in a range of 1-1.5 inch.

12. The apparatus of claim 1, wherein the generally upright struts are mutually spaced.

13. The apparatus of claim 1, wherein said porous support is a grating having an upper surface supporting the media bed comprising openings separated by solid portions.

14. The apparatus of claim 13, wherein said openings of said grating have a combined area at said upper surface within a range of 30-90% of a total area of the grating.

15. The apparatus of claim 13, wherein said openings of said grating have a combined area at said upper surface within a range of 40-70% of the total area of the grating.

16. The apparatus of claim 13, wherein said openings are elongated, having a width and a length, said width being smaller than said length.

17. The apparatus of claim 16, wherein said width of said openings is in a range of 0.75 to 0.88 inch.

18. The apparatus of claim 13, wherein said grating comprises an array of grating tiles of smaller upper surface area than said grating.

19. The apparatus of claim 1, wherein said housing is in two parts comprising a lower part retaining said heat regenerative media bed and an upper part detachable from said lower part.

20. The apparatus of claim 19, wherein said upper part and said lower part are joined by at least one hinge at one side of said housing.

21. The apparatus of claim 1, wherein said housing has a layer of heat insulating refractory material lining said first passageway.

22. The apparatus of claim 1, including a combustible-fuel burner housed in said burner housing.

23. A single stage regenerator for a regenerative burner apparatus, said regenerator comprising:
a housing enclosing a fluid-porous heat regenerative media bed having an upper surface and a lower surface, said housing having an opening communicating with an exterior of said apparatus and a port adapted for connection with a burner housing;
a first gas passageway in said housing directly interconnecting said port and said lower surface of said heat regenerative media bed; and
a second gas passageway in said housing interconnecting said opening in said housing communicating with said exterior and said upper surface of said heat regenerative media bed, said first and second gas passageways being in communication with each other substantially only through said heat regenerative media bed, wherein said heat regenerative media bed is supported on a porous support within said housing and wherein the porous support is held above a bottom surface of the housing by a plurality of generally upright struts.

24. A method of heating a furnace containing a charge to be heated and a vaporizable contaminant, wherein at least two regenerative burner apparatuses are used alternately to introduce heated combustion gases into the furnace and to recover heat from waste combustion gases vented from the furnace, and wherein said at least two regenerative burner apparatuses each employ a single stage heat regenerative burner bed having an upper surface and a lower surface, which method comprises alternately passing hot combustion gases from said furnace and then external combustion air through said heat regenerative media beds, wherein said hot combustion gases from said furnace are passed upwardly through at least one of said beds from said lower surface to said upper surface thereof, and said external combustion air is passed downwardly through said at least one of said heat regenerative beds from said upper surface to said lower surface thereof; wherein said contaminant in liquid form is removed from at least one of said apparatuses beneath said heat regenerative media beds thereof, and wherein said hot combustion gases are passed upwardly through said heat regenerative media beds at a constant rate of flow, except for a period of time during which said rate of flow is reduced to facilitate drainage of said contaminant in liquid form to drain from said bed.

25. The method of claim 24, wherein said hot combustion gases are passed upwardly through said heat regenerative media beds at a rate of flow in a range of 100-2,000 feet per minute.

26. The method of claim 24, wherein said hot combustion gases are passed upwardly through said heat regenerative media beds at a rate of flow in a range of 800-1,300 feet per minute.

27. The method of claim 24, wherein said period of time is in a range of 2 to 8 minutes for every hour of operation of each regenerative burner apparatus.

* * * * *